United States Patent Office 3,557,125
Patented Jan. 19, 1971

3,557,125
(−)-N-ETHYL-O-(BENZOYL OR p-NITROBENZOYL)-NORSCOPOLAMINE AND SALTS THEREOF
Karl Zeile, Rolf Banholzer, Gerhard Walther, Werner Schulz, and Helmut Wick, Ingelheim am Rhein, Germany, assignors to Boehringer Ingelheim G.m.b.H., Ingelheim am Rhein, Germany, a corporation of Germany
No Drawing. Continuation-in-part of application Ser. No. 611,262, Jan. 24, 1967. This application Aug. 25, 1969, Ser. No. 852,877
Claims priority, application Germany, Jan. 26, 1966, B 85,554
Int. Cl. C07d 43/06
U.S. Cl. 260—292     3 Claims

ABSTRACT OF THE DISCLOSURE (−)-N-ethyl-O-(benzoyl or p-nitrobenzoyl)-norscopolamine and non-toxic acid addition salts thereof, useful as antiperspirants.

---

This is a continuation-in-part of copending application Ser. No. 611,262, filed Jan. 24, 1967, now Pat. No. 3,472,861 dated Oct. 14, 1969.

This invention relates to (−)-N-ethyl-0-(benzoyl or p-nitrobenzoyl)-norscopolamine and non-toxic, pharmacologically acceptable acid addition salts thereof, as well as to a method of preparing these compounds.

More particularly, the present invention relates to the levo-rotatory optical isomer of a compound of the formula $$\text{O}\begin{array}{c}\text{CH—CH——CH}_2\\ \phantom{O}\text{N—C}_2\text{H}_5\ \text{CH—O—C—CH—C}_6\text{H}_5\\ \text{CH—CH——CH}_2\ \ \ \text{CH}_2\text{—O—R}\end{array}\quad (\text{I})$$

wherein R is benzoyl or p-nitro-benzoyl, and non-toxic, pharmacologically acceptable acid addition salts thereof.

A compound of the invention may be prepared by reacting (−)-N-ethyl-norscopolamine or a non-toxic acid addition salt thereof with a benzoyl halide of the formula $$\text{Hal—R} \quad (\text{II})$$

wherein R has the same meanings as in Formula I and Hal is a halogen, preferably chlorine, at elevated temperatures in the presence of an inert organic solvent, such as ether, lower alkanols, benzene, toluene, carbon tetrachloride and acetonitrile.

A levo-rotatory free base compound of the Formula I may, if desired, be converted pursuant to customary methods into a non-toxic, pharmacologically acceptable acid addition salt thereof; this conversion may, for instance, be effected by acidifying a solution of the levo-rotatory free base with the desired acid. Examples of non-toxic, pharmacologically acceptable acid addition salts are those formed with hydrochloric acid, hydrobromic acid, sulfuric acid, methane-sulfonic acid, lactic acid, tartaric acid, succinic acid, maleic acid, 8-chlorotheophylline or the like.

The following examples further illustrate the present invention and will enable others skilled in the art to understand it more completely.

EXAMPLE 1

(−)-N-ethyl-O-benzoyl-norscopolamine hydrochloride 8.85 gm. (0.025 mol) of (−)-N-ethyl-norscopolamine hydrochloride were suspended in a mixture consisting of 20.0 gm. (0.14 mol) of benzoyl chloride and 40 cc. of absolute toluene, and the suspension was heated at 115° C. for 24 hours. The suspended matter gradually went into solution and hydrogen chloride was given off. Thereafter, the toluene and the excess unreacted benzoyl chloride were distilled off, and the residue was recrystallized from a mixture of acetone and ether, yielding 10.5 gm. (91.7% of theory) of a white crystalline substance which was identified to be (−)-N-ethyl-O-benzoyl-norscopolamine hydrochloride, M.P. 190–191° C. (decomp.), specific rotation $[\alpha]_{20}^D = -26.75°$ (c.=2.0), of the formula $$\text{O}\begin{array}{c}\text{CH—CH——CH}_2\quad\quad\text{O}\\ \phantom{O}\text{N—C}_2\text{H}_5\ \text{CH—O—C—CH—C}_6\text{H}_5\\ \text{CH—CH——CH}_2\ \ \ \text{CH}_2\text{—O—C—C}_6\text{H}_5\\ \phantom{CH—CH——CH_2\ \ \ CH_2—O—}\text{O}\end{array}\ \cdot\text{HCl}$$

EXAMPLE 2

(−)-N-ethyl-O-(p-nitro-benzoyl)-norscopolamine hydrochloride 8.85 gm. (0.025 mol) of (−)-N-ethyl-norscopolamine hydrochloride were suspended in a mixture consisting of 4.65 gm. (0.025 mol) of p-nitro-benzoyl chloride and 100 cc. of absolute toluene, and the suspension was heated at 115° C. for 24 hours. Thereafter, the reaction solution was cooled, whereby a crystalline precipitate was formed which was collected and recrystallized from a mixture of acetonitrile and ether. 11.8 gm. (93.8% of theory) of a yellow crystalline substance were obtained, which was identified to be (−)-N-ethyl-O-(p-nitro-benzoyl)-norscopolamine hydrochloride, M.P. 161–162° C. (decomp.), specific rotation $[\alpha]_{20}^D = -36.7°$ (c.=2.0), of the formula $$\text{O}\begin{array}{c}\text{CH—CH——CH}_2\quad\quad\text{O}\\ \phantom{O}\text{N—C}_2\text{H}_5\ \text{CH—O—C—CH—C}_6\text{H}_5\\ \text{CH—CH——CH}_2\ \ \ \text{CH}_2\text{—O—C—}\!\!\!\bigcirc\!\!\!\text{—NO}_2\end{array}\ \cdot\text{HCl}$$

The compounds according to the present invention, that is, the levo-rotatory optical isomers of a compound of the Formula I and non-toxic, pharmacologically acceptable acid addition salts thereof, have useful pharmacodynamic properties. More particularly, the compounds of the instant invention exhibit antichlorinergic and antiperspirant activities in humans.

The antiperspirant activity of the compounds according to the present invention was tested on humans by the "armpit method" described in German Pat. 1,172,803; the compounds of the instant invention were found to be as effective as O-benzoyl-scopolamine hydrobromide but their duration of effective antiperspirant action was about twice as long as that of the O-benzoyl-scopolamine salt.

For antiperspirant purposes in humans, the compounds according to the present invention are topically applied to the skin area affected by excessive perspiration, namely, the armpits, as active ingredients in conventional antiperspirant compositions, i.e. compositions consisting essentially of a dermatologically compatible inert cosmetic carrier and an effective antiperspirant amount of the active ingredient, such as solutions, ointments or gels, of the type described in German Pat. 1,172,803. The effective antiperspirant concentration of a compound of the present invention in such topical compositions is from 0.005 to 0.2% by weight, based on the total weight of the composition. The pH of these compositions should be between about 3 and 6.5; in those instances where the antiperspirant ingredient is an acid addition salt of the instant invention formed with a strong acid, such as a hydrochloride, the pH will adjust itself automatically to the desired value. In other instances the pH may be adjusted to the desired value by addition of conventional buffers.

Particularly effective are aqueous 1% solutions and absolute ethanolic 0.02% solutions of the compounds pursuant to the present invention.

We claim:

1. A levo-rotatory optical isomer of a compound of the formula $$\begin{array}{c} \text{CH--CH------CH}_2 \quad\quad \text{O} \\ \diagup \quad | \quad\quad | \quad\quad\quad || \\ \text{O} \quad\quad \text{N--C}_2\text{H}_5 \quad \text{CH--O--C--CH--C}_6\text{H}_5 \\ \diagdown \quad | \quad\quad | \quad\quad\quad | \\ \text{CH--CH------C} \quad\quad \text{CH}_2\text{--O--R} \end{array} \quad (I)$$

wherein R is benzoyl or p-nitrobenzoyl, or a non-toxic, pharmacologically acceptable acid addition salt thereof.

2. A compound according to claim 1, which is (—)-N-ethyl-O-benzoyl-norscopolamine hydrochloride.

3. A compound according to claim 1, which is (—)-N-ethyl-O-(p-nitro-benzoyl)-norscopolamine hydrochloride.

References Cited

UNITED STATES PATENTS 2,814,623  11/1957  Moffett _____ 260—292
3,312,709   4/1967  Kilmer _____ 260—292

ALAN L. ROTMAN, Primary Examiner

U.S. Cl. X.R.

260—253; 424—253, 265